(12) United States Patent
Lee et al.

(10) Patent No.: US 10,750,444 B2
(45) Date of Patent: Aug. 18, 2020

(54) ADVANCED GRANT INDICATOR AND APERIODIC TRACKING REFERENCE SIGNAL IN DISCONTINUOUS RECEPTION

(71) Applicant: QUALCOMM Incorporated, San Diego, CA (US)

(72) Inventors: Heechoon Lee, San Diego, CA (US); Peter Pui Lok Ang, San Diego, CA (US); Tao Luo, San Diego, CA (US); Peter Gaal, San Diego, CA (US); Wanshi Chen, San Diego, CA (US); Juan Montojo, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 72 days.

(21) Appl. No.: 16/104,066

(22) Filed: Aug. 16, 2018

(65) Prior Publication Data

US 2019/0059054 A1 Feb. 21, 2019

Related U.S. Application Data

(60) Provisional application No. 62/547,719, filed on Aug. 18, 2017.

(51) Int. Cl.
*H04W 52/02* (2009.01)
*H04L 5/00* (2006.01)
(Continued)

(52) U.S. Cl.
CPC ......... *H04W 52/0216* (2013.01); *H04L 5/005* (2013.01); *H04L 5/0051* (2013.01);
(Continued)

(58) Field of Classification Search
CPC ............. H04W 52/0216; H04W 76/28; H04W 72/0446; H04W 5/0007; H04W 72/14; H04L 5/005; H04L 5/0051
See application file for complete search history.

(56) References Cited

U.S. PATENT DOCUMENTS

| | | | |
|---|---|---|---|
| 2008/0205494 A1* | 8/2008 | Whitehead | G01S 19/29 375/150 |
| 2014/0274030 A1* | 9/2014 | Aminzadeh | H04W 52/0238 455/424 |

(Continued)

OTHER PUBLICATIONS

International Search Report and Written Opinion—PCT/US2018/046976—ISA/EPO—dated Nov. 21, 2018.
(Continued)

*Primary Examiner* — Duc C Ho
(74) *Attorney, Agent, or Firm* — Loza & Loza LLP

(57) ABSTRACT

Aspects of the disclosure relate to wireless communications utilizing discontinuous reception (DRX). Disclosed methods and apparatus include providing a grant indicator in a transmission from a base station to a user equipment (UE), where indicator notifies the UE of a grant of data during a subsequent discontinuous reception (DRX) cycle in the at least one UE. Additionally, a tracking reference signal (TRS), which may be aperiodic (A-TRS), is transmitted prior to an on-duration time of the DRX cycle, where the TRS is usable by the UE for updating a tracking loop and also can be referenced by the indicator. In this manner, the combination of the grant indicator and the TRS affords a UE sufficient time for updating a UE tracking loop before the DRX cycle. Other aspects, embodiments, and features are also claimed and described.

39 Claims, 13 Drawing Sheets

(51) Int. Cl.
*H04W 76/28* (2018.01)
*H04W 72/04* (2009.01)
*H04W 72/14* (2009.01)

(52) U.S. Cl.
CPC ....... *H04W 72/0446* (2013.01); *H04W 76/28* (2018.02); *H04L 5/0007* (2013.01); *H04W 72/14* (2013.01)

(56) References Cited

U.S. PATENT DOCUMENTS

| | | | |
|---|---|---|---|
| 2015/0334656 A1* | 11/2015 | Ji | H04W 52/0245 370/252 |
| 2016/0057653 A1* | 2/2016 | Xu | H04L 27/00 370/229 |
| 2019/0281545 A1* | 9/2019 | Kim | H04W 52/0229 |

OTHER PUBLICATIONS

Qualcomm Incorporated: "Further Analysis on Fine Time/Frequency Tracking RS Design", 3GPP Draft, R1-1711175 Further Analysis on Fine TimefrequencyTracking RS Design, 3rd Generation Partnership Project (3GPP), Mobile Competence Centre, 650, Route Des Lucioles , F-06921 Sophia-Antipo, vol. Ran WG1, No. Qingdao, P.R. China, Jun. 27-30, 2017, Jun. 17, 2017 (Jun. 17, 2017), XP051305456, 25 Pages, Retrieved from the Internet:URL:http://www.3gpp.org/ftp/tsg_ran/WG1_RL1/TSGR1_AH/NR_AH_1706/Docs/ [retrieved on Jun. 17, 2017], Sections 2 and 3.

Qualcomm Incorporated: "UE Power Saving during Active State", 3GPP Draft; R1-1711227 UE_Power_Saving_During_Active_State, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27-30, 2017 Jun. 26, 2017 (Jun. 26, 2017), XP051300426, Retrieved from the Internet: URL:http://www.3gpp.org/ftp/Meetings_3GPP_SYNC/RAN1/Docs/ (and) URL:http://www.3gpp.org/ftp/Meetings_3GPP_SYNC/RAN1/Docs/ [retrieved on Jun. 26, 2017], 7 pages.

Qualcomm Incorporated: "Advanced Grant Indication for UE Power Saving", 3GPP TSG RAN WGI NR Ad-Hoc#2, R1-1711187, Qingdao, P.R. China;Jun. 27-30, 2017, Jun. 26, 2017 (Jun. 26, 2017), XP051300386, 5 Pages, URL:http://www.3gpp.org/ftp/Meetings_3GPP_SYNC/RAN1/Docs/ [retrieved on Jun. 26, 2017] Sections 1 to 2.2.2.

* cited by examiner

ADVANCED GRANT INDICATOR AND APERIODIC TRACKING REFERENCE SIGNAL IN DISCONTINUOUS RECEPTION

PRIORITY CLAIM

This application claims priority to and the benefit of provisional patent application No. 62/547,719 filed in the U.S. Patent and Trademark Office on Aug. 18, 2017, the entire content of which is incorporated herein by reference as if fully set forth below in its entirety and for all applicable purposes.

TECHNICAL FIELD

The technology discussed below relates generally to wireless communication systems, and more particularly to the provision and use of a grant indicator and a tracking reference signal (TRS) in a wireless communication system utilizing discontinuous reception (DRX).

INTRODUCTION

In particular wireless communication systems, in order to reduce power consumption to conserve battery power in wireless devices such as a user equipment (UE), a UE may be configured to discontinuously monitor for downlink (DL) transmissions where the DL transmissions are monitored only at predetermined periods (e.g., every 60 ms or 100 ms) during idle and inactive radio resource control (RRC) states. The process of discontinuously monitoring the DL transmissions to listen to paging messages during RRC idle states is known as discontinuous reception (DRX).

In further developments introduced in Release 8 by the 3rd Generation Partnership Project (3GPP), UEs may be configured to operate in what is known as connected mode DRX (CDRX). The purpose of CDRX is the same as DRX in RRC idle and inactive states, which is to conserve battery power in a wireless device such as a UE, but allows discontinuous reception during an RRC connected state. In particular, within a cycle of the CDRX mode, a UE may be awake (i.e., engaged in activities with Radio Frequency (RF) resources of the UE) for a period of time to monitor a physical downlink control channel (PDCCH) as well as a physical downlink shared channel (PDSCH), this period of time also known as the "on-duration" time. Within the same cycle, the UE may sleep (i.e., not be engaged in reception activities by idling the RF resources) for a period of time (e.g., "off-duration") to conserve power. In response to the UE receiving any downlink data from the network in the awake period, the UE may abandon the CDRX mode and continuously monitor the PDCCH for downlink data (e.g., continuous reception). Otherwise, the UE may sleep in the off-duration period to avoid power consumption. Additionally, during an RRC connected state when there is no data transmission in either direction (i.e., uplink UL or downlink DL), the UE may be configured to enter into the CDRX mode to start discontinuously monitoring the PDCCH.

With either DRX or CDRX, however, the occurrence of reference signals used in transmission frames may not be aligned with the DRX or CDRX cycle and, thus, the UE may not have an updated tracking loop available during the on-duration of the DRX or CDRX cycle. Accordingly, it would be beneficial to better ensure that a UE has an updated tracking loop available during each DRX or CDRX on-duration cycle.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to an aspect of the disclosure, a method of wireless communication is disclosed that includes providing at least one grant indicator in a transmission from a base station to a user equipment (UE), the indicator configured to notify the at least one UE of a grant of data during a subsequent discontinuous reception (DRX) cycle in the at least one UE. The method further includes transmitting a tracking reference signal (TRS) that is usable by the at least one UE for updating a tracking loop.

In another aspect, an apparatus for wireless communication is disclosed that includes means for providing at least one grant indicator in a transmission from a base station to a user equipment (UE), the grant indicator configured to notify the at least one UE of a grant during a cycle of a discontinuous reception (DRX) in the at least one UE. The apparatus further includes means for transmitting a tracking reference signal (TRS) referenced by the at least one grant indicator that is and usable by the at least one UE for updating a tracking loop.

In yet another aspect, a non-transitory computer-readable medium storing computer-executable code is disclosed. The code is configure to cause a computer to provide at least one grant indicator in a transmission from a base station to a user equipment (UE), the indicator configured to notify the at least one UE of a grant during a cycle of a discontinuous reception (DRX) in the at least one UE. The code also is configured to cause a computer to provide a tracking reference signal (TRS) usable by the at least one UE for updating a tracking loop.

According to still another disclosed aspect, an apparatus for wireless communication includes a processor, a transceiver communicatively coupled to the at least one processor, and a memory communicatively coupled to the at least one processor. The processor is configured to generate a transmission including at least one grant indicator for at least one user equipment (UE) for a transmission, the grant indicator configured to communicate a grant during a discontinuous reception (DRX) cycle to the at least one UE. Additionally, the processor is configured to transmit a tracking reference signal (TRS) enabling at least one UE to update a tracking loop. Furthermore, the transceiver is configured to transmit the transmission to the at least one UE.

In still another aspect, a method of wireless communication is disclosed that includes receiving, within a user equipment (UE), at least one grant indicator in a transmission from a base station, where the indicator configured to notify the UE of the presence of a grant of data during a discontinuous reception (DRX) cycle. Additionally, the method includes receiving a tracking reference signal (TRS) in the transmission usable by the at least one UE for updating a tracking loop.

According to yet another aspect, an apparatus for wireless communication is disclosed that includes means for receiving, within a user equipment (UE), at least one grant indicator in a transmission from a base station, the indicator configured to notify the UE of the presence of a grant during a discontinuous reception (DRX) cycle. The apparatus further includes means for receiving a tracking reference signal (TRS) in the transmission usable by the at least one UE for updating a tracking loop in the UE.

In another aspect, a non-transitory computer-readable medium storing computer-executable code is disclosed. The code causes a computer to receive at least one grant indicator in a transmission from a base station in a wireless communication system, the indicator configured to notify the UE of the presence of a grant during a cycle of a Discontinuous Reception (DRX). Additionally, the code causes a computer to receive a tracking reference signal (TRS) in the transmission usable by the at least one UE for updating a tracking loop, and update the tracking loop. Moreover, the code may cause a computer to then process the received grant during the DRX cycle after the tracking loop is updated.

According to yet one further aspect, an apparatus for wireless communication is disclosed including a processor, a transceiver communicatively coupled to the at least one processor, and a memory communicatively coupled to the at least one processor. The processor is configured to receive at least one grant indicator in a transmission from a base station in a wireless communication system, the indicator configured to notify the UE of the presence of a grant during a cycle of a Discontinuous Reception (DRX). Further, the process is configured to receive a tracking reference signal (TRS) in the transmission usable by the at least one UE for updating a tracking loop, and process the received grant during the DRX cycle after the tracking loop is updated.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
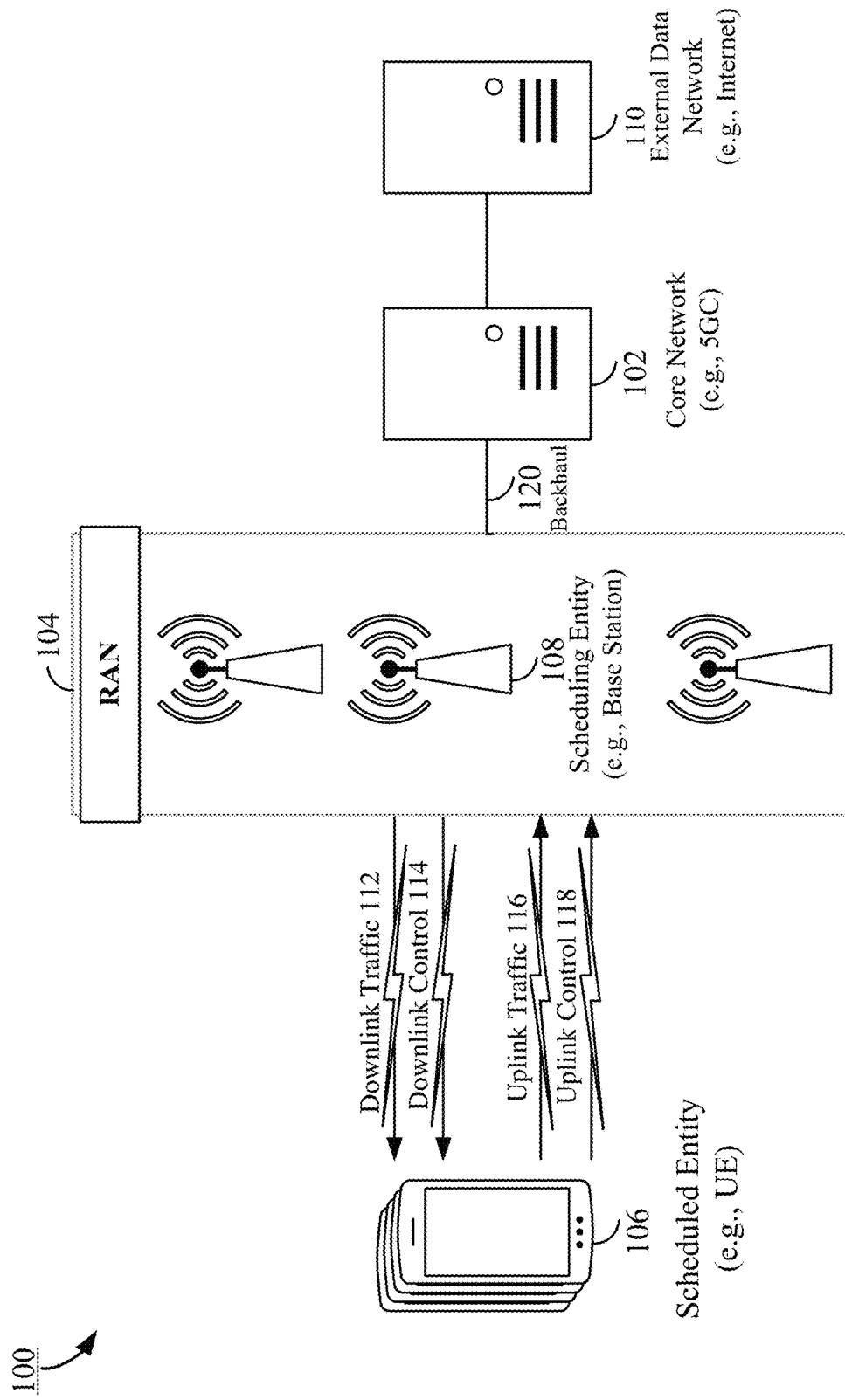
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In certain wireless communication systems, when a user equipment (UE) or mobile station (MS) is in a connected state, the UE may be configured to maintain tracking loops, such as time or frequency tracking loops through the utilization of periodic tracking reference signals (TRSs) provided by a base station or eNodeB in downlink (DL) transmissions. The UE may use the periodic TRSs in the DL transmissions to achieve or maintain timing and frequency tracking, which is used for synchronization with incoming signals, as an example. When DRX or CDRX is configured, the occurrence of the periodic TRS signaling used in transmissions may not be aligned with the DRX or CDRX cycle and, thus, the UE may not have an updated tracking loop available during an on-duration of the DRX or CDRX cycle, which is the period of time in the cycle when DL reception is being performed. Accordingly, it would be beneficial to provide TRSs with DRX or CDRX where a UE will be better ensured to have an updated tracking loop available during each DRX or CDRX cycle. Additionally, it is noted here that while particular disclosed examples herein are described in the specific context of certain DRX types, such as CDRX, it is to be understood that the disclosed methods and apparatus are applicable more broadly to general DRX and are not limited only to specific CDRX applications.

In order to better ensure that a UE device will have an updated tracking loop available during each DRX or CDRX cycle, the present disclosure provides a number of various methods and apparatus. In particular, the disclosure provides for the use of an aperiodic tracking reference signal (A-TRS) at the beginning of a DRX or CDRX cycle, rather than a periodic TRS provided regardless of the DRX or CDRX cycle or point in the DRX or CDRX cycle. It is noted that, in certain aspects, aperiodic TRS (A-TRS) as used herein refers to transmission of a TRS that is not tied to a specific or specified periodicity, in contrast to periodic TRS that is transmitted according to a pre-configured periodicity (e.g., at 10, 20, 40, 80, or 160 ms). It is noted that tracking reference signals may be used by UEs for fine time tracking, fine frequency tracking, determining path delay spread or Doppler spread.

Furthermore, the present disclosure provides for the use of an indicator that indicates the presence of grants during an on-duration of each DRX or CDRX cycle, and is referred to herein as an Advanced Grant Indicator (AGI), but also generally as a "grant indicator" or simply "indicator." As used herein, the term "grant" refers to the grant (e.g., allocation) or potential grant of data or data channels that will occur in a transmission during an on-duration of the DRX or CDRX cycle. In a particular example, a grant may be the physical downlink control channel (PDCCH). Also, concerning the relationship of the A-TRS to the AGI, the AGI may be configured to be a trigger for the A-TRS according to certain aspects disclosed herein. In other aspects of the disclosure provided below, the AGI may be considered to be one type of downlink control indicator (DCI) format for a PDCCH. In other aspects, the AGI may be combined with a TRS, where the TRS is configured to provide the AGI to a UE, as will be discussed further herein. As will be also described herein, the AGI can be configured to indicate a grant for a single UE or for a group of UEs. Furthermore, the disclosed A-TRS may be configured to be provisioned for a single UE or for a group of UEs.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
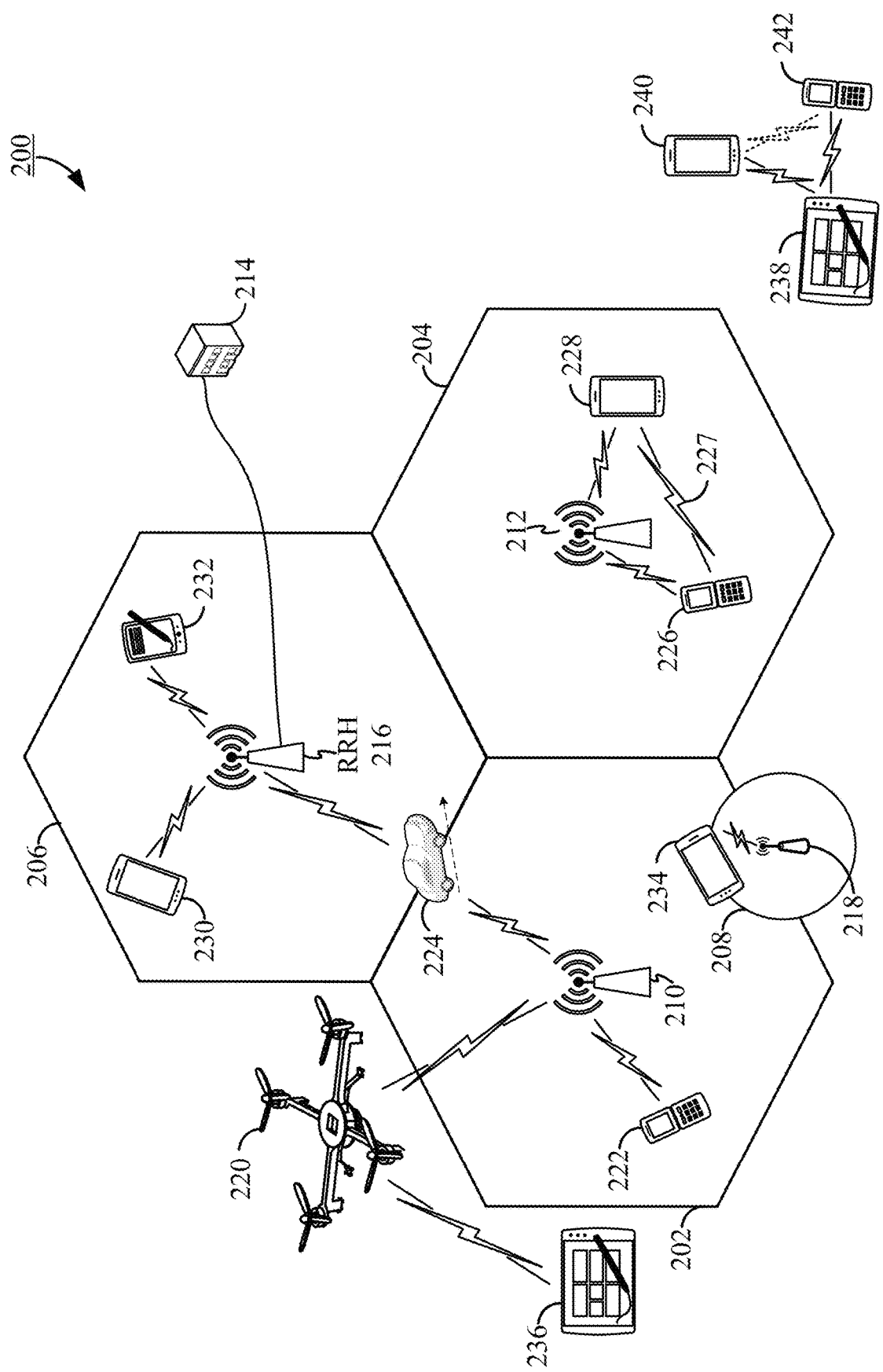
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

As referred to within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 404 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE. In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUCCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
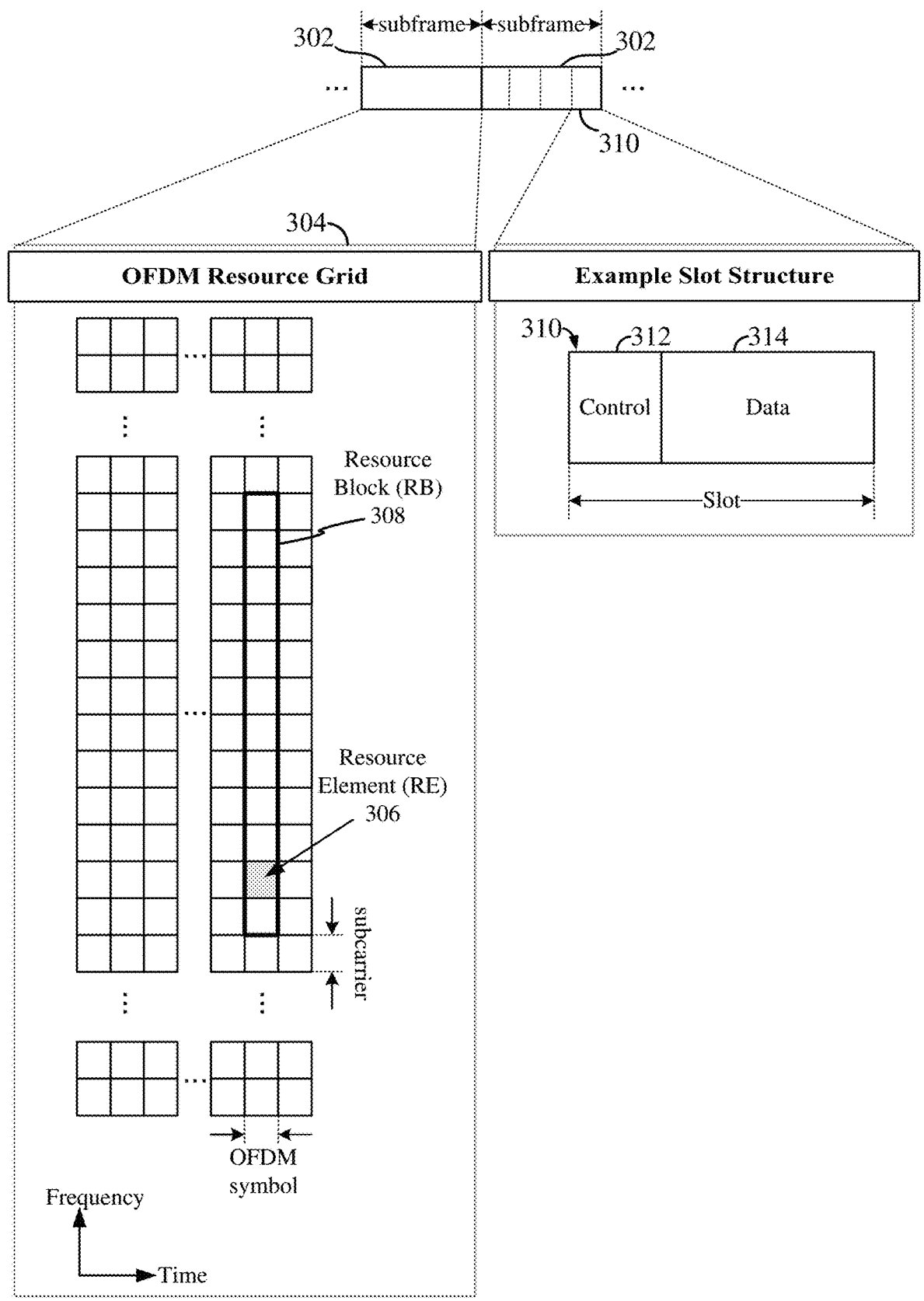
FIG. 3 illustrates an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
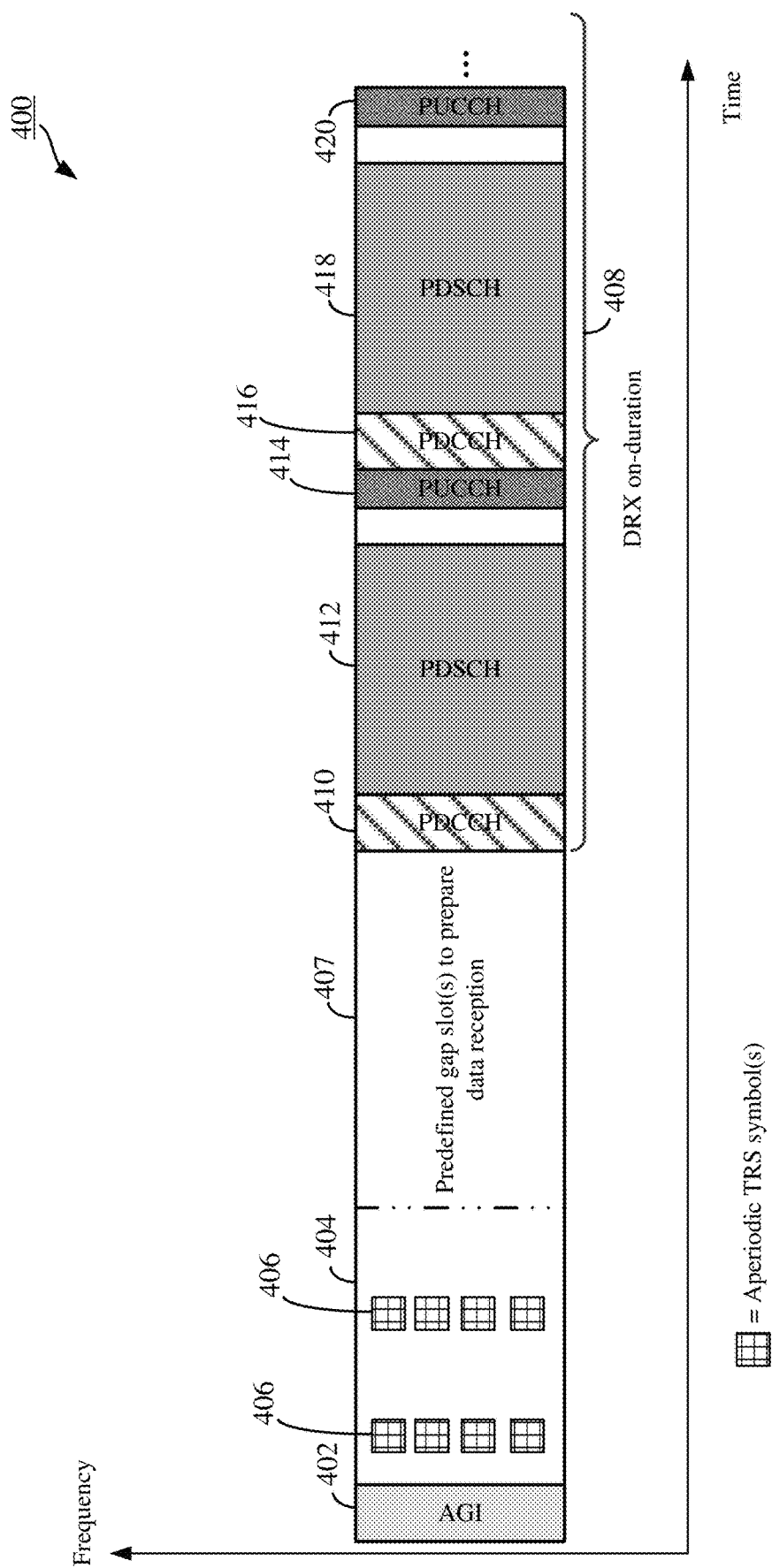
FIG. 4 illustrates an exemplary portion of a transmission frame using a grant indicator that is used for a group of two or more UEs and aperiodic A-TRS reference signaling that is also used for a group of two or more UEs.

Turning to specific examples of the present disclosure, FIG. 4 illustrates an exemplary downlink (DL) frame portion 400 from a base station. The illustrated frame portion 400 may be comprised of multiple slots, and the portion 400 including a grant indicator (e.g., an Advanced Grant Indicator (AGI)) that is directed to and used by one or more UEs. The information within the AGI may include an identifier (ID) when used for a particular UE, a group ID when used for a group of UEs. Further, the AGI may be configured with information indicating which slot or slots to monitor within a DRX on-duration time or period. Still further, the AGI may include information indicating the presence or location of the A-TRS with respect to the AGI. The frame portion 400 also includes aperiodic tracking reference signaling (A-TRS) that is used by one or more UEs.

According to an aspect of the present disclosure, the frame portion 400 includes an AGI 402 that is shown occurring at a time prior to a data region 404 of the frame portion 400 in which the A-TRS signaling 406 (i.e., resource blocks and/or symbols 406) is transmitted. In some examples, the AGI 402 may be configured to be within a control region of at least one slot (e.g., the first symbol or symbols within a slot), and the A-TRS signaling 406 may be configured to be located within the data region 404 occurring after the AGI slot. Additionally, the frame portion 400 includes predefined gap slot(s) 407 occurring in time after the A-TRS signaling 406 and configured to allow the UE to prepare for data reception. It is noted that the number of gap slots or slot time duration may be some predefined minimum number of slots or time that would provide sufficient time for a UE to process the A-TRS signaling 406.

As mentioned before, the AGI 402 includes information that indicates the presence of grants during an on-duration time 408 of each CDRX cycle. As mentioned before, the term "grant" may defined as a grant or allocation of data or information (or at least the potential allocation of such). Moreover, a specific example of data or information of what may constitute a "grant" is the physical downlink control channel (PDCCH). Furthermore, according to certain aspects, the PDCCH may be a downlink (DL) grant to schedule a Physical Downlink Shared Channel (PDSCH), as one example, or an uplink (UL) grant to schedule a Physical Uplink Shared Channel (PUSCH), as another example. In other aspects, a UE will monitor other PDCCHs that constitute a "grant", such as a group common PDCCH including a slot format indicator, preemption indicator, and group Transmission Power Control TPC.

The AGI 402 may be used to then indicate the need for a given UE to monitor the CDRX on-duration time 408, where the AGI 402 would only need to be sent by a base station or eNodeB when grants are present during a given cycle. This allows further power savings as the UE can then skip CDRX cycles where there will be no such grant for that UE. It is further noted that a particular AGI designated for a group of UEs need not necessarily be the same UE group or group size as that of the group of UEs that utilize the A-TRS signaling. For example, a UE group for the A-TRS can be wider or larger than that of the AGI UE group.

In implementations of disclosed AGIs herein, it is noted here that the radio access network (RAN) in which the UEs operate will configure the UEs in the network for using the AGI. In particular, the RAN will configure the various UEs operable within the RAN concerning when and/or where to monitor or expect the AGI to be located within a frame or transmission, and may also include configurations of how the UEs will specifically respond to the AGI.

According to yet another aspect of the present disclosure, the AGI 402 is configured to be a type of format for the PDCCH and occurs or is placed within a typical PDCCH location or in place thereof (e.g., at particular OFDM symbols that normally contain PDCCH within given slots) or, in other words, a separate physical channel. According to a further aspect, the AGI 402 may be conveyed by the PDCCH, rather than replacing the PDCCH.

It is noted that the AGI 402 may be configured to affirmatively or positively indicate the presence of grants for the CDRX on-duration time 408. That is, when an AGI 402 is present (i.e., an affirmative indication by the AGI), the UE will wake up according to CDRX protocols to monitor for grants in the upcoming CDRX on-duration time 408. In an alternative aspect, the system in which the AGI is being utilized may be configured such that the default is that grants are assumed to be present by the UE and thus the UE will, by default, monitor for grants. In such case, the AGI 402 will then indicate the lack of the presence of grants (i.e., a "negative grant indicator"), thereby signaling the UE that monitoring of grants is not necessitated and that the on-duration period 408 of the current CDRX cycle may be skipped by the UE(s).

In another aspect, the illustrated frame 400 shows the use of A-TRS signals 406 in the time period 404 occurring after the AGI 402 and before the on-duration cycle or period 408. In the particular example of FIG. 4, the AGI 402 is always succeeded with A-TRS, which would then ensure that the UE will have updated tracking loop training to be ready for the on-duration time 408. Furthermore, upon detection of the AGI 402, each of the UEs corresponding to the UE group will follow or act upon the information in the AGI 402; i.e., monitoring during the on-duration time 408. It is noted here that while the A-TRS signals are shown in the example herein using two symbols within a slot, the disclosure is not limited to such and the A-TRS could be configured to use only one symbol or more than two symbols, as well as multiple slots.

It is noted that in some instances, however, it may not be desirable to wake up a group of UEs that individually may or may not have traffic. Accordingly, the AGI 402 may be configured with further information, such as a particular time offset, that indicates which particular slot(s) to monitor in the frame during the on-duration time 408 for each UE in the group. Thus, each UE may have a different on-duration time 408 that is indicated through the particular offset. It is also noted that a single UE may belong to multiple groups, not just one group, and thus the AGI 402 might, in this scenario, be communicated by base station to a UE using one of multiple AGIs corresponding to different groups.

As further illustrated in FIG. 4, during the on-duration time 408 for CDRX, the DL transmitted channels that are monitored by a UE include the Physical Downlink Control Channel (PDCCH) 410, the Physical Downlink Shared Channel (PDSCH) 412, and the Physical Uplink Control Channel (PUCCH) 414, and the periodic repetitions thereof as exemplified by reference numbers 416, 418, and 420. Of still further note, although the frame and, in particular, the AGI 402 and the A-TRS signaling 406 are shown in a time division multiplexed (TDM) manner, it is also contemplated that the AGI and A-TRS may be implemented in a frequency division multiplexed (FDM) manner or even a Code Division Multiplexed (CDM) manner. In still another aspect, the AGI could be scrambled with a Radio Network Temporary Identifier (RNTI) or similar identifier.

As will be appreciated by those skilled in the art, the use of the AGI 402 allows early signaling in the frame timeline of a resource grant to a UE and the use of aperiodic TRS signaling 406 allows the selective and/or non-periodic provisioning of TRS placement in the frame to be better aligned with a CDRX cycle. This placement allows the UE sufficient time to update tracking loops before commencement of the on-duration time of the CDRX cycle.

Figure 5:
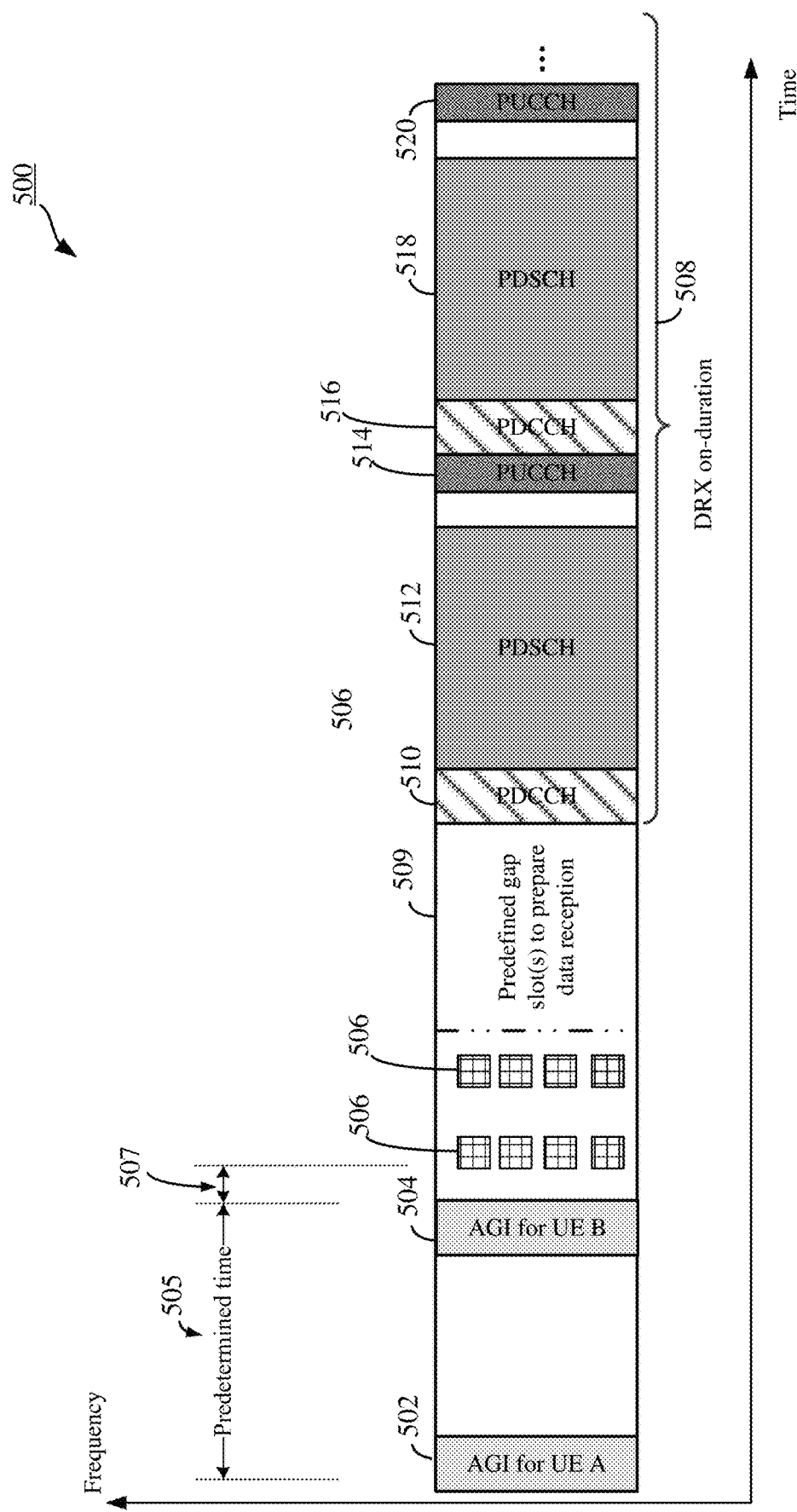
FIG. 5 illustrates an exemplary portion of a frame using a grant indicator for each individual UE in a group of UEs, while using aperiodic A-TRS reference signaling that is common to the group of two or more UEs.

FIG. 5 illustrates another example of a portion of a transmission frame 500 using grant indicators (e.g., an Advanced grant indicator (AGI)) for individual UEs in a group of UEs, while using aperiodic A-TRS reference signaling that is common to the group of UEs. As illustrated, the transmission frame 500 includes a first AGI 502 that is designated for a first UE (e.g., "UE A") in the group of UEs. The transmission frame 500 also includes a second AGI 504 that is designated for a second UE (e.g., "UE B") in the group of UEs. The illustrated transmission frame portion 500 shows time division multiplexing (TDM) of at least two different AGIs 502 and 504 over a predetermined time duration 505. In other aspects, the AGIs 502 and 504 could instead be frequency division multiplexed (FDM) or code division multiplexed (CDM). The use of an AGI for each UE that needs to perform monitoring allows further power savings as only those UEs will wake up to perform monitoring during the on-duration of the CDRX cycle 508.

In another aspect, frame 500 illustrates the use of A-TRS signals 506 for the grouping of UEs (e.g., UE A and UE B) that occur during a specified or predetermined time period 507 that occurs after the AGIs 502 and 504 are transmitted. In the particular example of FIG. 5, the AGIs 502, 504 are succeeded with A-TRS signaling 506, which would then ensure that the UEs (e.g., UE a and UE B) will have updated tracking loop training to be ready for the on-duration time 508. The time duration 507 between the AGIs 502 or 504 and the A-TRS 506 may be predetermined, selectable, or configurable according to an aspect to ensure that the last UE in time (e.g., UE B) has sufficient time for tracking loop training prior to the CDRX on-duration, which is illustrated by duration 509 consisting of a number of predefined slots. As further illustrated in FIG. 5, during the on-duration time 508 for CDRX cycle, the transmitted channels to be received and processed are the Physical Downlink Control Channel (PDCCH) 510, the Physical Downlink Shared Channel (PDSCH) 512, and the Physical Uplink Control Channel (PUCCH) 514 received during the on-duration time 508, as well as the periodic repetitions thereof as exemplified by reference numbers 516, 518, and 520.

Figure 6:
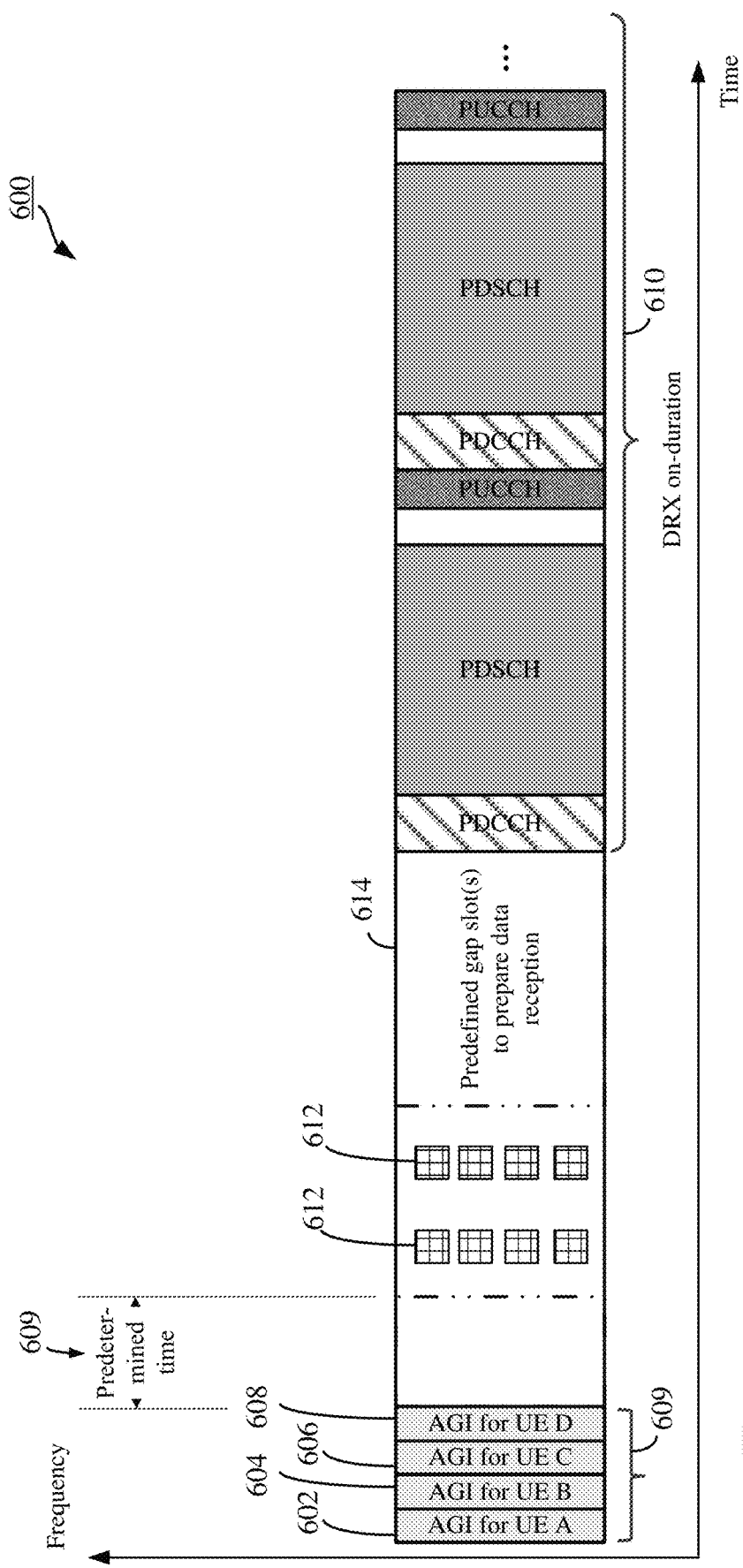
FIG. 6 illustrates another exemplary portion of a frame using grant indicators for individual UEs in a group of UEs time multiplexed within a slot using mini-slots, while using aperiodic A-TRS reference signaling that is common to the group of two or more UEs.

FIG. 6 illustrates another exemplary portion of a transmission frame 600 using grant indicators (e.g., Advanced grant indicators (AGIs)) for individual UEs in a group of UEs time multiplexed within a slot using mini-slots, while using aperiodic A-TRS reference signaling 612 that is common to the group of two or more UEs. In the example of FIG. 6 each UE receiving an AGI is signaled with a respective AGI within mini-slots in a slot. As illustrated, first through fourth UEs (e.g., UE A through UE D) receive respective AGIs 602, 604, 606, and 608 from a base station in respective mini-slots within a single slot 609, which may be a slot normally used for PDCCH, for example. The mini-slot configured AGIs can be considered to multiplex many UEs for each CDRX on-duration cycle 610. Although only four mini-slots are illustrated in the example of FIG. 6, the disclosure is not limited to such and either the use of more mini-slots per slot or more slots with some set number of mini-slots per slot may be envisioned, such that more UEs may be multiplexed.

Similar to the examples of FIGS. 4 and 5, the frame 600 also includes a predefined number of slots in a time duration 614, which is the time provision to ensure sufficient time for tracking loop training prior to the CDRX on-duration 610. As further illustrated in FIG. 6, during the on-duration time 610 for CDRX cycle, the transmitted channels to be received and processed include the Physical Downlink Control Channel (PDCCH), the Physical Downlink Shared Channel, and the Physical Uplink Control Channel (PUCCH) in the same manner as previously shown in FIGS. 4 and 5.

Figure 7:
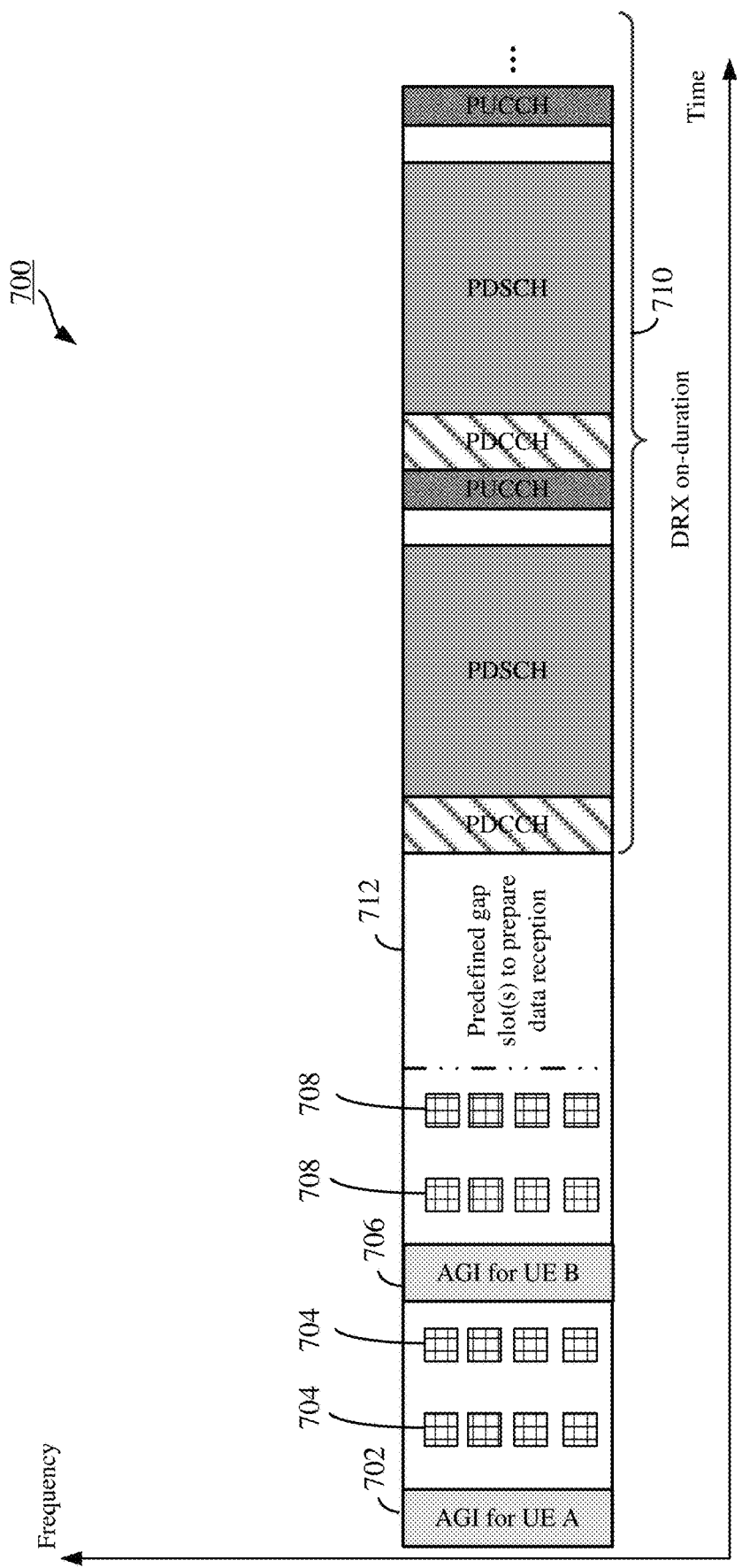
FIG. 7 illustrates another exemplary portion of a frame using grant indicators for individual UEs in a group of UEs, as well as using aperiodic A-TRS reference signaling for each UE.

FIG. 7 illustrates another exemplary portion of a transmission frame 700 using grant indicators (e.g., Advanced grant indicators (AGIs)) for individual UEs in a group of UEs, as well as using aperiodic A-TRS reference signaling for each UE. As may be seen in exemplary transmission frame 700, a first AGI 702 is transmitted for a particular UE (e.g., UE A) and then followed by an A-TRS transmission 704 to be used for loop training by the UE A Similarly, a second AGI 706 is transmitted for a particular UE (e.g., UE B) and then followed by an A-TRS transmission 708 for loop training for the UE B. Accordingly, each AGI is associated with its own A-TRS (e.g., AGI 702 is associated with A-TRS 704, and AGI 706 is associated with A-TRS 708). In the example of FIG. 7, the AGI and A-TRS transmissions are shown time multiplexed, but the disclosure is not limited to such and the transmissions of the AGIs and the A-TRS could be FDM or CDM, in aspects. Additionally, in an aspect, each of the AGIs (e.g., 702, 706) and A-TRSs (e.g., 704, 708) are transmitted in time before the CDRX on-duration time period 710, as illustrated.

Similar to the examples of FIGS. 4-6, the frame 700 also includes a predefined number of slots in a time duration 712, which is the time provision to ensure sufficient time for tracking loop training prior to the CDRX on-duration 710. As further illustrated in FIG. 7, during the on-duration time 710 for CDRX cycle, the transmitted channels to be received and processed include the Physical Downlink Control Channel (PDCCH), the Physical Downlink Shared Channel, and the Physical Uplink Control Channel (PUCCH) in the same manner as previously shown in FIGS. 4-6.

According to yet another aspect, it is contemplated that the TRS may be implemented without the use of a grant indicator, but configured to still ensure that a training loop is performed prior to an on-duration CDRX cycle. In one aspect, a periodic TRS may be configured to be transmitted for each frame or subframe before the CDRX on-duration period, but with UE specific subsampling for some CDRX cycles (i.e., the TRS is not sampled every CDRX cycle). For example, a particular UE may be configured to sample the periodic TRS transmission every CDRX fourth cycle. Thus, there is still a power savings as the UE does not sample every CDRX cycle. It will be appreciated by those skilled in the art that, since the subsampling is UE specific, a different UE may sample the periodic TRS (or A-TRS) for each cycle. For example, if there are four UEs, at a first CDRX cycle, a UE A would sample the TRS, at a second CDRX cycle a UE B would sample the TRS, and so forth for UE C and UE D during respective third and fourth CDRX cycles, and then the subsampling would start over with UE A after the fourth UE D is sampled at the fourth CDRX cycle.

Figure 8:
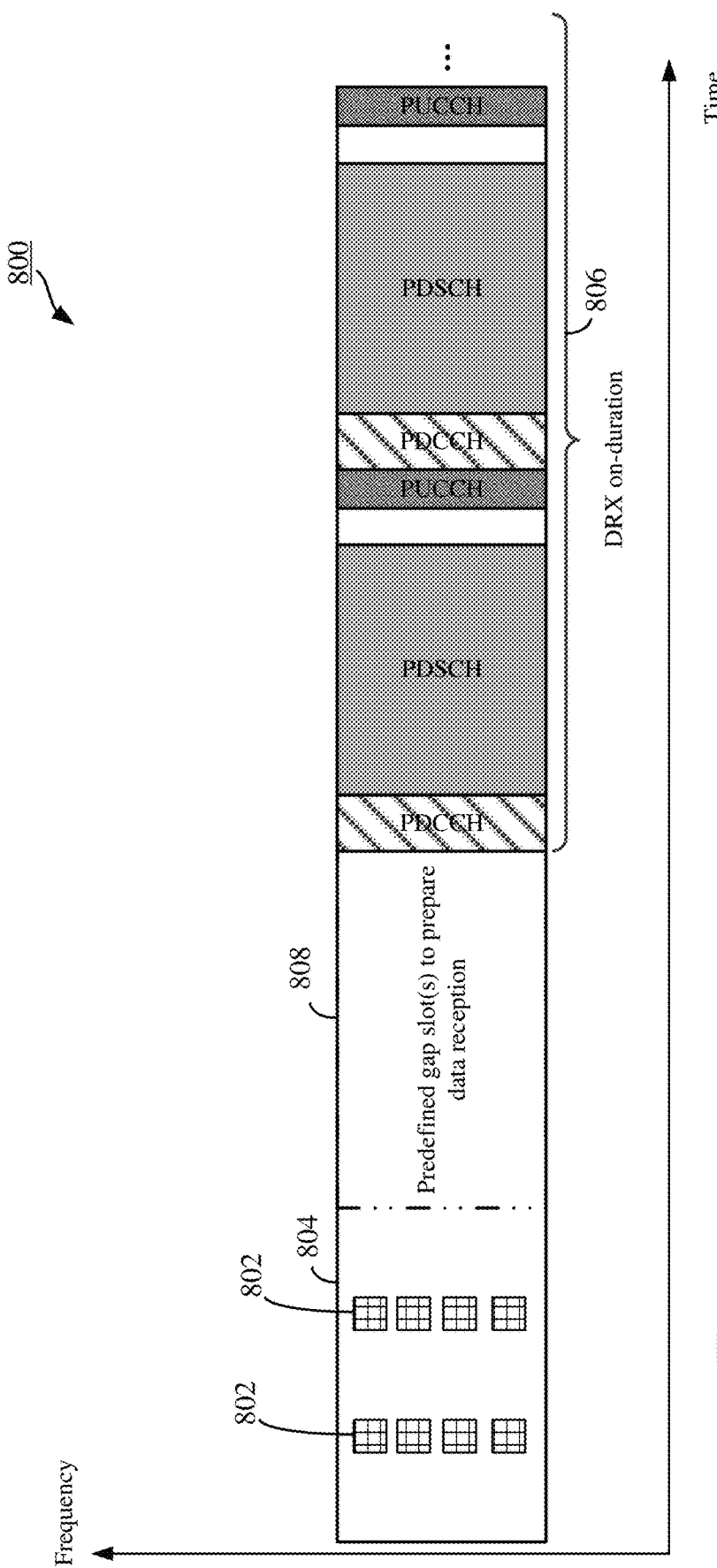
FIG. 8 illustrates an exemplary portion of a frame where an AGI provided through the use of an A-TRS transmission utilized for one or more UEs.

According to another aspect, FIG. 8 illustrates an exemplary transmission 800 using an A-TRS transmission to provide a grant indicator (e.g., AGI) for a UE. In a first aspect, A-TRS resources 802 may be selectively transmitted in instances or situations when it is known that data will be transmitted during an on-duration of the DRX or CDRX cycle. As illustrated in FIG. 8, the A-TRS resources 802 are transmitted during a first time portion 804 for a frame or subframe that will include an on-duration CDRX cycle 806. Conversely, when the frame or subframe does not include data to be transmitted during the on-duration CDRX cycle, the A-TRS resources 802 would not be transmitted in transmission 800. In an aspect of this example, a UE receiving transmission 800 will perform an A-TRS detection based tracking loop to detect the A-TRS resources 802. When A-TRS resources are transmitted, in this example these resources are configured to indicate to the UE that a predetermined number of gap slots 808 will be present in the transmission 800 to allow the UE to adjust tracking loops for the reception and decoding of the channels transmitted during the on-duration period 806. According to yet another aspect, the TRS may be transmitted during each transmission on a per frame or per subframe basis, for example, where transmission of the TRS is independent of the CDRX cycle of on-duration or off-duration.

Figure 9:
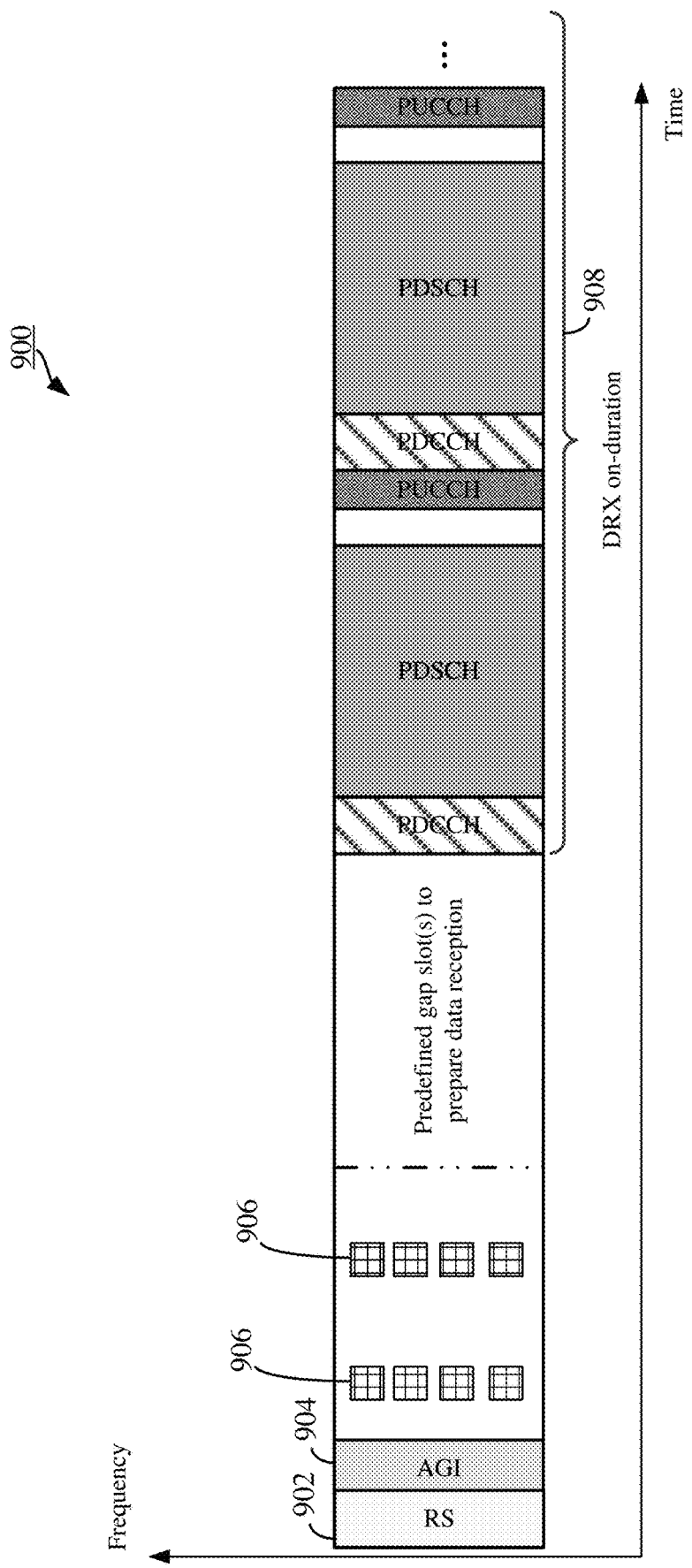
FIG. 9 illustrates an exemplary portion of a frame including an additional reference signal (RS) prior to an AGI.

FIG. 9 illustrates a further exemplary transmission frame portion 900 that includes the use of an additional reference signal (RS). In this example, the transmission 900 includes an additional reference signal (RS) placed prior to the AGI in time that may be used to facilitate AGI detection. An example of this additional RS is illustrated in the transmission 900 shown in FIG. 9, where the RS 902 is located in time prior to the AGI 904. In particular, the present transmissions illustrated FIGS. 4-7 may be configured such that a base station sends an additional reference signal (RS) in time prior to the AGI itself in order to facilitate AGI detection.

According to other aspects, it is noted that an AGI may be configured to include adaptive bandwidth adaptation (e.g., an adaptive widening of the bandwidth in a component carrier from narrowband to wideband for data reception). In such case, the AGI may be used to indicate whether the system starts with narrow or wide bandwidth part (BWP). Furthermore in this case, a certain predefined time gap or a variable time gap dependent upon the bandwidth part may be added between an AGI and the A-TRS (not shown in FIGS. 4-9), which allows a UE to adjust for the larger bandwidth (or smaller bandwidth if the bandwidth is decreased as indicated in the AGI). For example, the previously illustrated transmissions shown in illustrate essentially the AGI and A-TRS in in the same slot (or adjacent slots), whereas a larger time gap across two or more slots may be contemplated when using adaptive bandwidth. In other aspects, the adaptive bandwidth indication may be among pre-configured (by higher layer signaling) BWP options. Yet further, another contemplated case is a case where the AGI is not utilized, but still adaptive bandwidth adaption is used. In this case, if a UE receives an adaptive bandwidth part indication, the A-TRS will be configured to be associated with the indication. It is also noted that such case is independent of CDRX According to still another aspect, it is further contemplated that in those examples using a per group A-TRS (e.g., FIGS. 4, 5, and 6), the A-TRS may be placed in the first slot(s) of the on-duration CDRX cycle rather than before the on-duration CDRX cycle as illustrated. According to further aspect, the AGI functionality may be combined into the TRS. In such case, a UE ID or Group ID may be carried in the TRS, such as by scrambling in one example. In yet another aspect, both per UE AGIs and per group AGIs may be utilized together in certain systems. In this case, the per group AGI would be used for panic cases where there is ambiguity concerning particular UEs.

Figure 10:
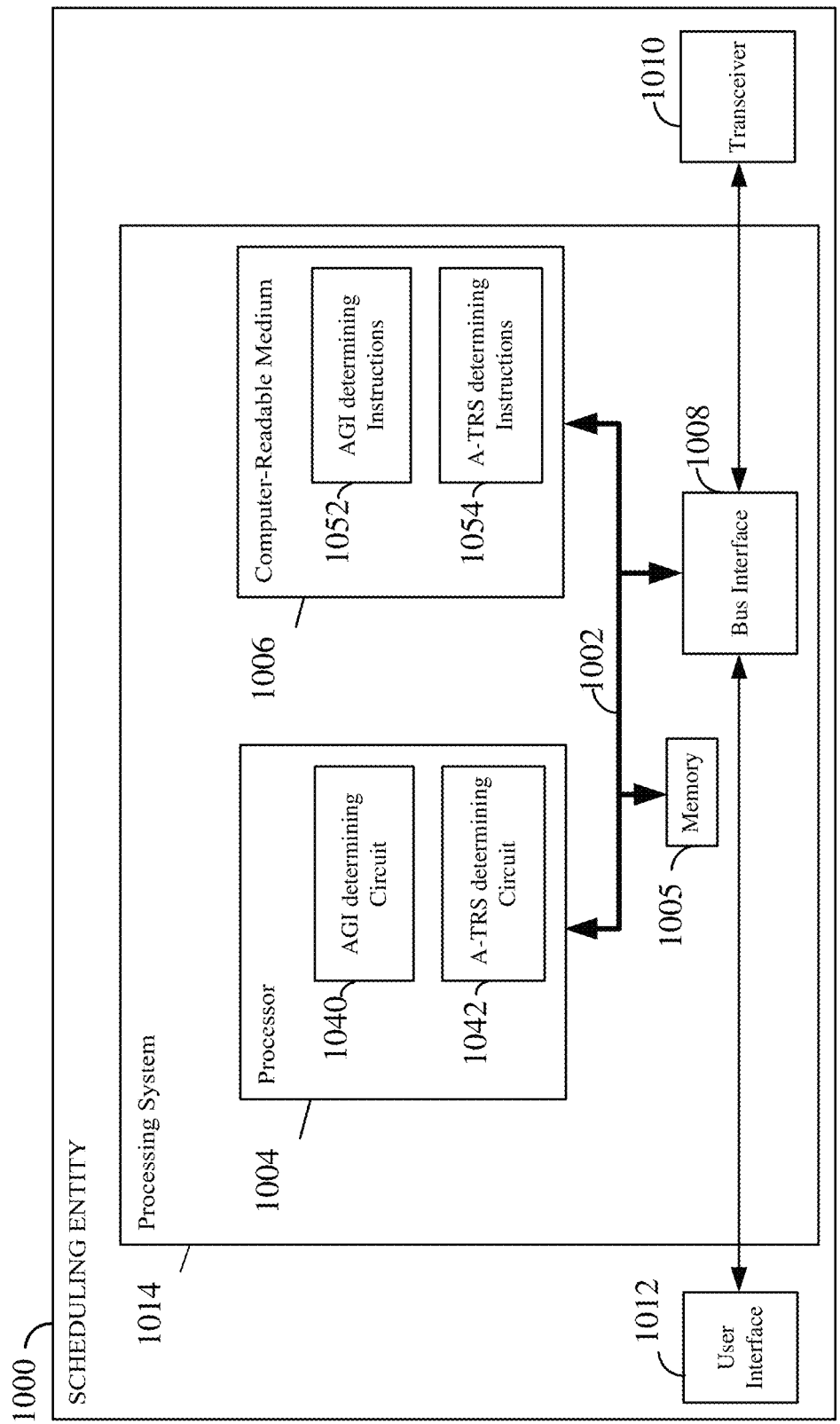
FIG. 10 is a block diagram illustrating an example of a hardware implementation for a scheduling entity apparatus employing a processing system.

FIG. 10 is a block diagram illustrating an example of a hardware implementation for a scheduling entity 1000 employing a processing system 1014. For example, the scheduling entity 1000 may be a user equipment (UE) as illustrated in any one or more of FIG. 1 or 2. In another example, the scheduling entity 1000 may be a base station as illustrated in any one or more of FIGS. 1 and 2.

The scheduling entity 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions described herein. That is, the processor 1004, as utilized in a scheduling entity 1000, may be used to implement any one or more of the processes and procedures described below and illustrated in FIG. 10.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided.

In some aspects of the disclosure, the processor 1004 may include AGI determination circuitry 1040 configured for various functions, including, for example, determining the AGI including information and coding/scrambling thereof, as well as mini-slot multiplexing, per UE or per UE group transmission, bandwidth adaptation and determining additional RS signaling prior to the AGI. For example, the AG determination circuitry 1040 may be configured to implement one or more of the functions described below in relation to FIG. 11, including, e.g., block 1102.

In some aspects of the disclosure, the processor 1004 may include AGI determination circuitry 1042 configured for various functions, including, for example, determining the A-TRS or TRS determination including timing thereof and whether per UE or per group of UEs. For example, the AG determination circuitry 1042 may be configured to implement one or more of the functions described below in relation to FIG. 11, including, e.g., block 1104.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1006 may include AGI determining software or instructions 1052 configured for various functions, including, for example, information and coding/scrambling thereof, as well as mini-slot multiplexing, per UE or per UE group transmission, bandwidth adaptation and determining additional RS signaling prior to the AGI. For example, the AGI determination software or instructions 1052 may be configured to implement one or more of the functions described below in relation to FIG. 12, including, e.g., blocks 1202 or 1204.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIG. 1 or 2, and utilizing, for example, the processes and/or algorithms described herein in relation to FIGS. 4-9.

In one or more examples, the computer-readable storage medium 1006 may include A-TRS determining software or instructions 1054 configured for various functions, including, for example, information and coding/scrambling thereof, as well as mini-slot multiplexing, per UE or per UE group transmission, bandwidth adaptation and determining additional RS signaling prior to the AGI. For example, the AGI determination software or instructions 1054 may be configured to implement one or more of the functions described below in relation to FIG. 11, including, e.g., block 1104.

Figure 11:
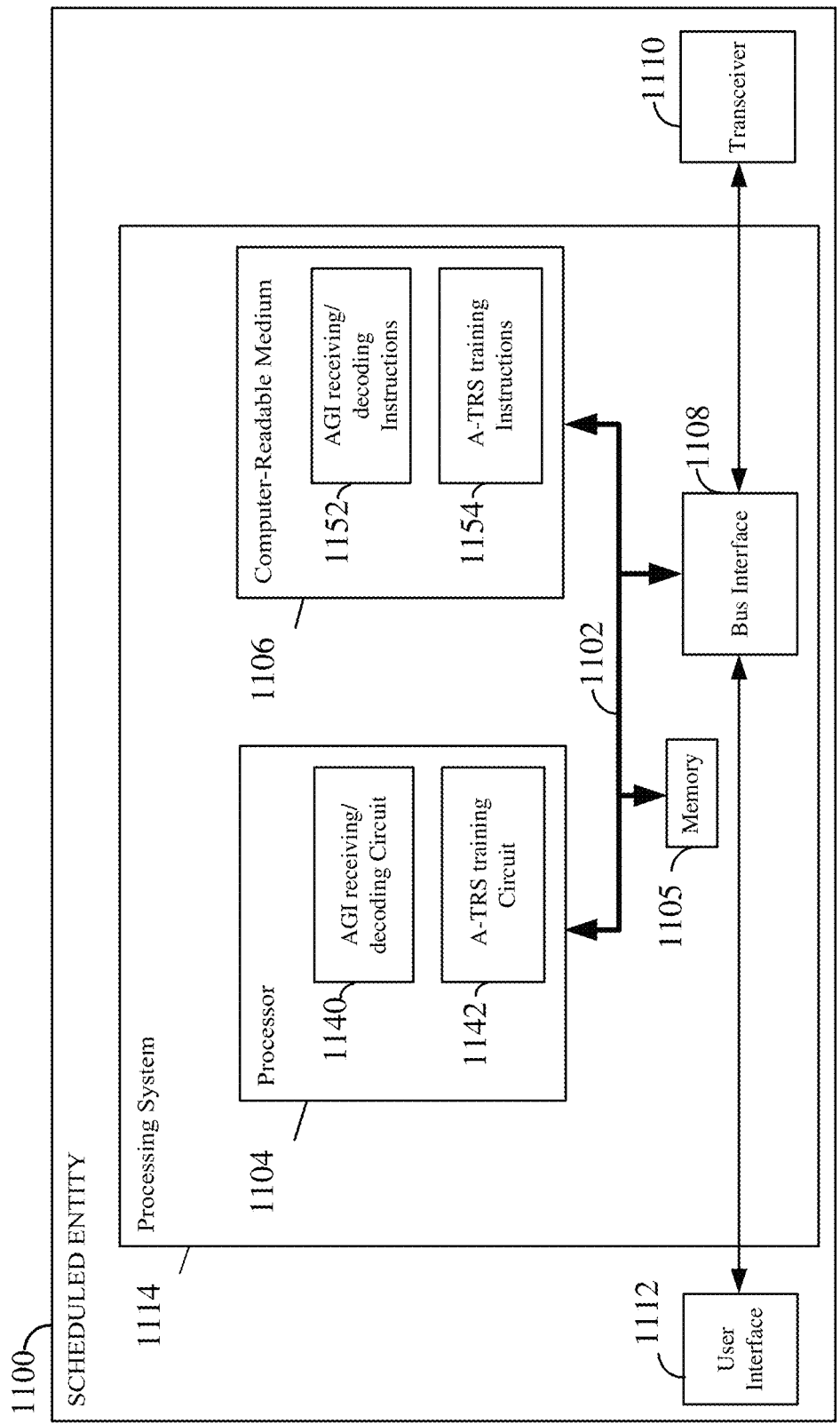
FIG. 11 is a block diagram illustrating an example of a hardware implementation for a scheduled entity apparatus employing a processing system.

FIG. 11 is a conceptual diagram illustrating an example of a hardware implementation for an exemplary scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a user equipment (UE) as illustrated in any one or more of FIGS. 1 and 2.

The processing system 1114 may be substantially the same as the processing system 1014 illustrated in FIG. 10, including a bus interface 1108, a bus 1102, memory 1105, a processor 1104, and a computer-readable medium 1106. Furthermore, the scheduled entity 1100 may include a user interface 1112 and a transceiver 1110 substantially similar to those described above in FIG. 10. That is, the processor 1104, as utilized in a scheduled entity 1100, may be used to implement any one or more of the processes described below and illustrated in FIG. 11.

In some aspects of the disclosure, the processor 1104 may include AGI receiving/decoding circuitry 1140 configured for various functions, including, for example, receiving the AGI and determining whether CDRX monitoring is warranted. For example, the circuitry 1140 may be configured to implement one or more of the functions described below in relation to FIG. 13, including, e.g., blocks 1302 or 1304.

In some aspects of the disclosure, the processor 1104 may include A-TRS training circuitry 1140 configured for various functions, including, for example, receiving the A-TRS and determining the channel estimation prior to the CDRX on-duration cycle. For example, the circuitry 1140 may be configured to implement one or more of the functions described below in relation to FIG. 13, including, e.g., block 1304.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIG. 1 or 2, and utilizing, for example, the processes and/or algorithms described herein in relation to FIGS. 4-9.

Figure 12:
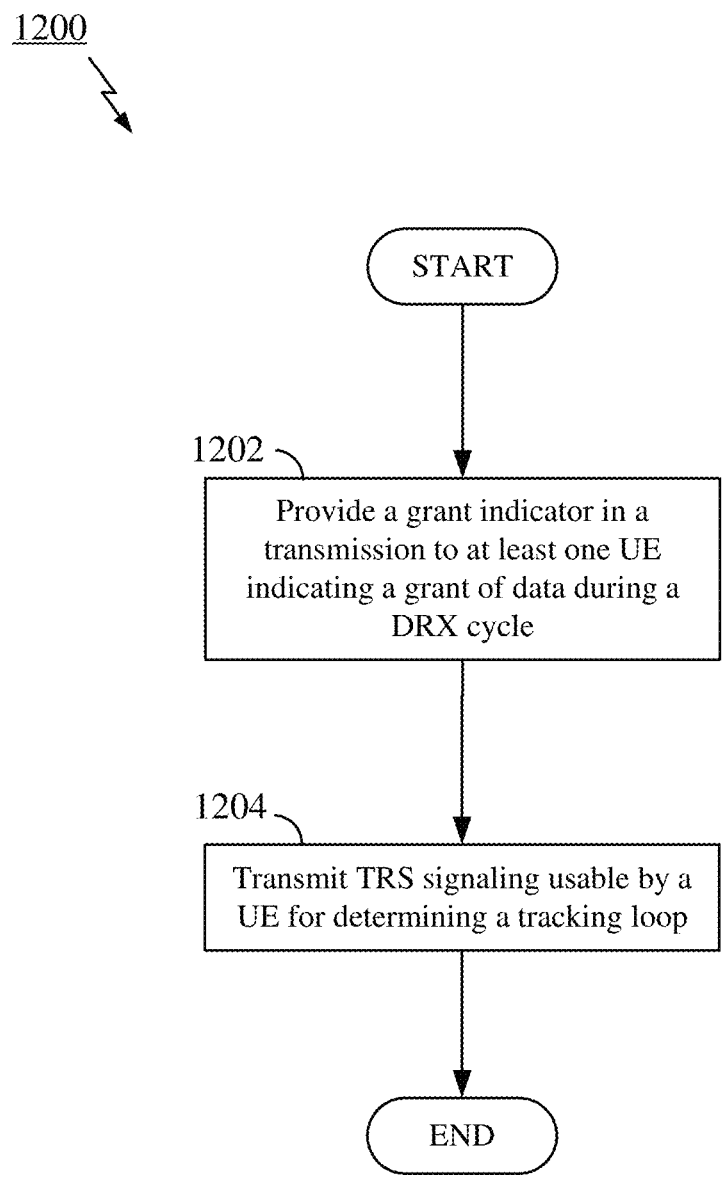
FIG. 12 is a flow diagram of an exemplary method for transmission in a wireless system.

FIG. 12 is a flow chart illustrating an exemplary process 1200 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 1000 illustrated in FIG. 10. In some examples, the process 1200 may be carried out by any suitable apparatus or means for carrying out the functions or algorithm described below.

At block 1202, a base station or eNodeB transmits, determines, or provides a grant indicator to at least one user equipment (UE) in a transmission, where the grant indicator is configured to communicate a grant of data that will (or might) occur during a cycle of DRX or CDRX to the at least one user equipment (UE). As discussed herein, the provision of the grant indicator in block 1202 may include the active transmission of AGI fields or symbols as illustrated in FIGS. 4-7 and 9, or, alternatively, the provision of the grant indicator in the transmission may be through the transmission of the TRS as illustrated in FIG. 8. At block 1204, the method 1200 further includes transmitting, determining, or providing a tracking reference signal (TRS) in the transmission, such as an A-TRS, that is usable by the at least one UE to adjust, update, or determine a tracking loop for then further monitoring DRX or CDRX on-duration cycle signals/channels. In an example, the updating of tracking loop includes providing a sufficient number of predetermined or predefined gap slots or time period in a transmission (e.g., 407 in FIG. 4) to achieve the tracking loop update.

In other examples, method 1200 may also include the at least one grant indicator being configured to communicate the presence of the grant to a plurality of UEs, such as in the examples of FIGS. 5-7. Additionally, the TRS is an aperiodic TRS as discussed above where the aperiodic TRS resources are selectively positioned within a transmission frame of the transmission between a grant indicator (e.g., an AGI) and the DRX cycle as shown in FIG. 4-7 or 9, as examples. In a further example, method 1200 may include the grant indicator being configured to indicate or communicate the position of the TRS or A-TRS within the transmission frame. In this manner, the grant indicator acts to dynamically indicate the location of the TRS.

According to further aspects, method 1200 may feature the at least one grant indicator being located within a physical downlink control channel (PDCCH) in a slot of a transmission frame of the transmission in advance of the CDRX cycle including the grant. For example, the grant indicator AGI 402 shown in FIG. 4 may be located within a PDCCH slot, which may further be located at the start of a frame or subframe. In particular aspects, the grant indicator is utilizing a location normally reserved or used for the PDCCH. In other aspects, it is contemplated that both the PDCCH and the grant indicator could be co-located within the slot typically used for the PDCCH.

In yet other aspects, method 1200 may include providing a plurality of grant indicators in the transmission, where each grant indicator of the plurality of grant indicators is located within a respective minislot of a plurality of minislots within at least one slot in the transmission. An implementation of this feature may be seen in FIG. 6, as one example. Additionally, each of the plurality of grant indicators may be configured to signal a respective UE of a plurality of UEs, as also illustrated in FIG. 6 showing each minislot is configured to signal a different UE, as one example. Furthermore, each grant indicator for a UE in the transmission may also be associated with a respective TRS for the same UE.

In still further aspects, method 1200 may include the grant indicator including bandwidth adaptation signaling that is usable in a UE to adaptively change a reception bandwidth of the UE, as discussed earlier. Although not illustrated herein, method 1200 may further include the TRS being transmitted in at least a first slot of the DRX or CDRX time period within the transmission. In one example of this feature using the numbering of FIG. 4, the TRS (e.g., A-TRS resources 406) may be included in at least the slot carrying PDCCH shown with reference number 410.

Other aspects of method 1200 may include the grant indicator being combined into the TRS or, in other words, the grant indication is communicated through the TRS, and the structure of the transmission will look like the example of FIG. 8. In another aspect, method 1200 may include providing a further reference signal prior in time to the grant indicator in the transmission, where the further reference signal is configured to assist in the detection of the grant indicator by the UE. An example of this feature may be seen in FIG. 9, for example. In yet another aspect, method 1200 may further the location of A-TRS within the transmission being determined or determinable the grant indicator being configured to indicate the A-TRS location or, alternatively, based on a predetermined A-TRS location that is determined by the radio resource control (RRC).

Figure 13:
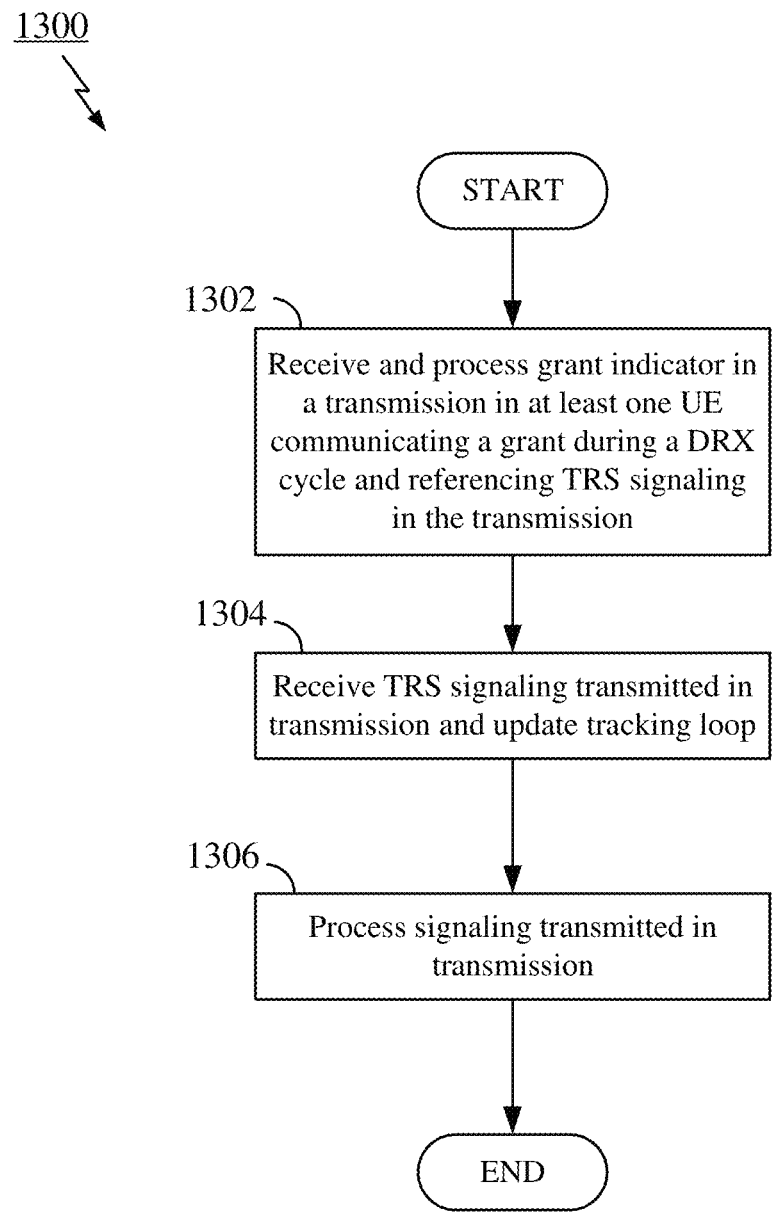
FIG. 13 is another flow diagram of an exemplary method for receiving transmissions in a wireless system.

FIG. 13 is a flow chart illustrating an exemplary process 1300 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the schedule entity 1100 illustrated in FIG. 11. In some examples, the process 1300 may be carried out by any suitable apparatus or means for carrying out the functions or algorithm described below.

As illustrated at block 1302, a UE receives a grant indicator (e.g., an AGI) in a transmission from a base station, where the grant indicator configured to communicate a grant during a cycle of a DRX or Connected Mode Discontinuous Reception (CDRX) in the at least one user equipment (UE). In another aspect, the process in 1302 includes processing the grant indicator and then the UE using the grant indication to determine whether to monitor the transmission during the DRX or CDRX on-duration period of the transmission (i.e., monitoring would occur is a grant is indicated, whereas no monitoring would be performed if no resource grant is indicated). In an example, the processes of block 1302 may be performed by transceiver 1110 for receiving transmissions and processor 1104 and/or circuitry 1140 in the scheduled entity 1100 as illustrated in FIG. 11 for processing/determining if the resource grant is indicated by the grant indicator.

At block 1304, the method 1300 further includes receiving and processing a tracking reference signal (TRS) in the transmission, such as an A-TRS, that is usable by the UE to update a tracking loop for then further monitoring the transmission signals or channels (e.g., PDCCH, PDSCH, etc.) in the DRX or CDRX on-duration cycle. In receiving a tracking reference signal (TRS) in the transmission usable by the at least one UE for updating a tracking loop. In an example, the processes of block 1302 may be performed by transceiver 1110 and processor 1104 and/or circuitry 1140 in the scheduled entity 1100 illustrated in FIG. 11. In an example, the processes of block 1302 may be performed by transceiver 1110 for receiving transmissions and processor 1104 and/or circuitry 1142 in the scheduled entity 1100 as illustrated in FIG. 11 for processing/determining tracking loop updates. As further illustrated at block 1304, the method may further include updating the tracking loop in the UE prior to processing the grant during the on-duration cycle.

Method 1300 further includes processing the received grant during the DRX or CDRX cycle after the tracking loop is updated as illustrated in block 1306. In an example, the processes of block 1306 may be performed by transceiver 1110 for receiving the transmission and processor 1104 in the scheduled entity 1100 as illustrated in FIG. 11 for processing the various channels during the on-duration DRX or CDRX cycle.

In further aspects, method 1300 includes the feature of the TRS being an aperiodic TRS (A-TRS) that is selectively located in at least one or time or frequency within the transmission. Additionally, the method 1300 may further include updating the tracking loop in the at least one user equipment (UE) based on detection of the A-TRS in the transmission. According to other aspects, the at least one grant indicator is configured to be located within a PDCCH of a slot in advance of the DRX or CDRX cycle including the grant, wherein the UE or scheduled entity is configured to process the grant indicator before receiving the TRS and processing the channels during the on-duration of the DRX or CDRX cycle.

According to still further aspects, method 1300 includes the plurality of grant indicators being included in the transmission, wherein each grant indicator is located within respective mini-slots within a slot in the transmission. In such case, a UE or scheduled entity is configured to recognize which a plurality of grant indicators is pertinent to that UE and then process the respectively pertinent TRS, accordingly. In still further aspects, the grant indicator may include bandwidth adaptation signaling, where the UE adjusts its usable bandwidth based on the bandwidth adaptation signaling.

In still further aspects, method 1300 includes the receiving an additional reference signal (RS) prior to the grant indicator that is configured to assist the UE to detect the grant indicator, such as was illustrated in FIG. 9. In this case, the UE is configured to detect the additional RS as part of the detection process of the grant indicator, which occurs in the frame subsequent in time to the additional RS. According to yet another aspect, method 1300 may also include periodically subsampling the TRS for a predetermined portion of a plurality of on-duration DRX or CDRX cycles in the transmission. That is, the UE may be configured to look at every other TRS in the transmission or multiple transmissions, or every third TRS, or every fourth TRS, as other examples, according to whatever predetermined subsampling interval is to be used for the UE and the wireless communication system.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication comprising:
   providing at least one grant indicator in a transmission from a base station to at least one user equipment (UE), the at least one grant indicator configured to notify the at least one UE of a grant of data during a discontinuous reception (DRX) cycle; and
   transmitting an aperiodic tracking reference signal (TRS), the at least one grant indicator and the aperiodic TRS configured to enable the at least one UE to update a tracking loop before an on-duration of the DRX cycle.

2. The method of claim 1, wherein the at least one grant indicator is configured to communicate the presence of respective grants of data to a plurality of UEs.

3. The method of claim 1, wherein the aperiodic TRS is selectively positioned within a transmission frame of the transmission between the at least one grant indicator and the DRX cycle.

4. The method of claim 3, wherein the at least one grant indicator is configured to indicate a position of the aperiodic TRS within the transmission frame.

5. The method of claim 1, wherein the at least one grant indicator is delivered by a physical downlink control channel (PDCCH) in a slot of a transmission frame of the transmission in advance of or during the DRX cycle.

6. The method of claim 1, further comprising:
   providing a plurality of grant indicators in the transmission, wherein each of the plurality of grant indicators is located within a respective minislot of a plurality of minislots within at least one slot in the transmission.

7. The method of claim 1, further comprising:
   providing a plurality of grant indicators in the transmission, wherein each of the plurality of grant indicators is configured to signal a respective UE of a plurality of UEs, and the aperiodic TRS is configured for a group of UEs of the plurality of UEs.

8. The method of claim 1, further comprising:
   providing a plurality of grant indicators in the transmission, wherein each of the plurality of grant indicators is designated for a respective UE in the transmission and is associated with a respective aperiodic TRS for the same UE.

9. The method of claim 1, wherein the grant indicator includes bandwidth adaptation signaling usable in a UE to adaptively change a reception bandwidth of the UE.

10. The method of claim 1, wherein the aperiodic TRS is transmitted in at least a first slot of the on-duration of the DRX cycle within the transmission.

11. The method of claim 1, wherein providing the at least one grant indicator comprises signaling the grant through the transmission of the aperiodic TRS in the transmission.

12. The method of claim 1, further comprising:
    providing a reference signal prior in time to the at least one grant indicator in the transmission, the reference signal configured to assist detection of the at least one grant indicator by the UE.

13. The method of claim 1, wherein a location of the aperiodic TRS within the transmission is determined by at least one of:
the at least one grant indicator further configured to indicate the location of the aperiodic TRS to a UE; or
a predetermined aperiodic TRS location determined by a radio resource control (RRC).

14. An apparatus for wireless communication, comprising:
means for providing at least one grant indicator in a transmission from a base station to at least one user equipment (UE), the at least one grant indicator configured to notify the at least one UE of a grant of data during a discontinuous reception (DRX) cycle; and
means for transmitting an aperiodic tracking reference signal (TRS), the at least one grant indicator and the aperiodic TRS configured to enable the at least one UE to update a tracking loop before an on-duration of the DRX cycle.

15. The apparatus of claim 14, wherein the at least one grant indicator is configured to communicate the presence of the grant to a plurality of UEs.

16. The apparatus of claim 14, wherein the aperiodic TRS is selectively positioned within a transmission frame of the transmission between the at least one grant indicator and the DRX cycle.

17. The apparatus of claim 14, further comprising:
means for providing a plurality of grant indicators in the transmission, wherein each of the plurality of grant indicators is located within a respective minislot of a plurality of minislots within at least one slot in the transmission.

18. The apparatus of claim 14, further comprising:
means for providing a reference signal prior in time to the at least one grant indicator in the transmission, the reference signal configured to assist detection of the at least one grant indicator by the UE.

19. A non-transitory computer-readable medium storing computer-executable code, comprising code for causing a computer to:
provide at least one grant indicator in a transmission from a base station to at least one user equipment (UE), the at least one grant indicator configured to notify the at least one UE of a grant of data during a discontinuous reception (DRX) cycle; and
transmit an aperiodic tracking reference signal (TRS), the at least one grant indicator and the aperiodic TRS configured to enable the at least one UE to update a tracking loop before an on-duration of the DRX cycle.

20. The non-transitory computer-readable medium of claim 19, wherein the aperiodic TRS is selectively positioned within a transmission frame of the transmission between the at least one grant indicator and the DRX cycle.

21. An apparatus for wireless communication, comprising:
a processor;
a transceiver communicatively coupled to the processor; and
a memory communicatively coupled to the processor,
wherein the processor is configured to generate a transmission including:
at least one grant indicator for at least one user equipment (UE), the at least one grant indicator configured to notify the at least one UE of a grant of data during a discontinuous reception (DRX) cycle;
an aperiodic tracking reference signal (TRS), the at least one grant indicator and the aperiodic TRS configured to enable the at least one UE to update a tracking loop before an on-duration of the DRX cycle; and
wherein the transceiver is configured to transmit the transmission to the at least one UE.

22. The apparatus of claim 21, wherein the aperiodic TRS is selectively positioned within a transmission frame of the transmission between the at least one grant indicator and the DRX cycle.

23. A method of wireless communication, comprising:
receiving, at a user equipment (UE), at least one grant indicator in a transmission from a base station, the at least one grant indicator configured to notify the UE of the presence of a grant of data during a discontinuous reception (DRX) cycle;
receiving an aperiodic tracking reference signal (TRS) in the transmission; and
updating a tracking loop before an on-duration of the DRX cycle based on the at least one grant indicator and the aperiodic TRS.

24. The method of claim 23, further comprising:
processing the received grant during the DRX cycle after the tracking loop is updated.

25. The method of claim 23, wherein the aperiodic TRS is selectively located within a transmission frame of the transmission between the at least one grant indicator and the DRX cycle.

26. The method of claim 25, wherein the at least one grant indicator indicates a position of the aperiodic TRS within the transmission frame.

27. The method of claim 25, further comprising:
updating the tracking loop in the UE based on detection of the aperiodic TRS in the transmission.

28. The method of claim 23, wherein the at least one grant indicator is located within a physical downlink control channel (PDCCH) of a slot in advance of the DRX cycle including the grant.

29. The method of claim 23, wherein the at least one grant indicator comprises a plurality of grant indicators included in the transmission, wherein each grant indicator is located in a respective mini-slot of a plurality of mini-slots within a slot in the transmission.

30. The method of claim 23, further comprising:
adjusting a reception bandwidth in the UE based on a bandwidth adaptation signaling included in the at least one grant indicator.

31. The method of claim 23, further comprising:
receiving a reference signal prior to the at least one grant indicator, the reference signal configured to assist the UE to detect the at least one grant indicator.

32. The method of claim 23, further comprising:
periodically subsampling the aperiodic TRS for a predetermined portion of a plurality of on-duration DRX cycles in the transmission.

33. An apparatus for wireless communication, comprising:
means for receiving, at a user equipment (UE), at least one grant indicator in a transmission from a base station, the at least one grant indicator configured to notify the UE of the presence of a grant of data during a discontinuous reception (DRX) cycle; and
means for receiving an aperiodic tracking reference signal (TRS) in the transmission; and
means for updating a tracking loop before an on-duration of the DRX cycle based on the at least one grant indicator and the aperiodic TRS.

34. The apparatus of claim 33, further comprising:
means for processing the received grant during the DRX cycle after the tracking loop is updated.

35. The apparatus of claim 33, wherein the aperiodic TRS is selectively located within a transmission frame of the transmission between the at least one grant indicator and the DRX cycle.

36. A non-transitory computer-readable medium storing computer-executable code, comprising code for causing a user equipment (UE) to:
receive at least one grant indicator in a transmission from a base station in a wireless communication system, the at least one grant indicator configured to notify the UE of the presence of a grant of data during a discontinuous reception (DRX) cycle;
receive an aperiodic tracking reference signal (TRS) in the transmission usable by the at least one UE for updating a tracking loop;
update the tracking loop before an on-duration of the DRX cycle based on the at least one grant indicator and the aperiodic TRS; and
process the received grant during the DRX cycle after the tracking loop is updated.

37. The non-transitory computer-readable medium of claim 36, wherein the aperiodic TRS is selectively positioned within a transmission frame of the transmission between the at least one grant indicator and the DRX cycle.

38. An apparatus for wireless communication, comprising:
a processor;
a transceiver communicatively coupled to the processor; and
a memory communicatively coupled to the processor, wherein the processor is configured to:
receive at least one grant indicator in a transmission from a base station in a wireless communication system, the at least one grant indicator configured to notify the apparatus of the presence of a grant of data during a discontinuous reception (DRX) cycle;
receive an aperiodic tracking reference signal (TRS) in the transmission;
update a tracking loop before an on-duration of the DRX cycle based on the at least one grant indicator and the aperiodic TRS; and
process the received grant during the DRX cycle after the tracking loop is updated.

39. The apparatus of claim 38, wherein the processor is further configured to update the tracking loop based on detection of the aperiodic TRS in the transmission.

* * * * *